United States Patent [19]
Nakao

[11] Patent Number: 5,313,714
[45] Date of Patent: May 24, 1994

[54] INSTRUMENT FOR MEASURING DIMENSIONS OF A CAN SEAM PORTION

[75] Inventor: Saburo Nakao, Machida, Japan

[73] Assignee: The Coca-Cola Company, Atlanta

[21] Appl. No.: 852,234

[22] PCT Filed: Oct. 7, 1991

[86] PCT No.: PCT/JP91/01362
§ 371 Date: Jun. 8, 1992
§ 102(e) Date: Jun. 8, 1992

[87] PCT Pub. No.: WO92/06348
PCT Pub. Date: Apr. 16, 1992

[30] Foreign Application Priority Data
Oct. 8, 1990 [JP] Japan .................. 2-268524

[51] Int. Cl.[5] ........................................ G01B 5/02
[52] U.S. Cl. ........................ 33/522; 33/549; 33/555; 33/548
[58] Field of Search ............ 33/522, 783, 712, 548, 33/549, 552, 553, 555

[56] References Cited
U.S. PATENT DOCUMENTS

| | | | |
|---|---|---|---|
| 2,835,040 | 5/1958 | D'Elia | 33/549 |
| 3,021,603 | 2/1962 | Beeson | 33/548 |
| 3,769,713 | 11/1973 | Norman | 33/522 |
| 4,112,579 | 9/1978 | Kaye | 33/522 |
| 4,862,596 | 9/1989 | Iino et al. | 33/522 |
| 5,148,611 | 9/1992 | Raetzel | 33/549 |

FOREIGN PATENT DOCUMENTS

| | | | |
|---|---|---|---|
| 64-002744 | 6/1989 | Japan . | |
| 0616526 | 7/1978 | U.S.S.R. | 33/549 |
| 2205404 | 6/1988 | United Kingdom . | |

Primary Examiner—William A. Cuchlinski, Jr.
Assistant Examiner—Alvin Wirthlin

[57] ABSTRACT

An instrument for measuring dimensions of a can seam portion including a criterion measuring pin, a linear gauge provided with a measuring spindle which is so supported as to be movable along a straight line L in the direction of approaching said criterion measuring pin and in the direction of leaving said criterion measuring pin, a can cap supporting block, and a can body supporting block. The can cap supporting block holds the can such that the direction of measuring can seaming thickness T coincides with the straight line L so that the inner face of the can seam portion contacts the criterion measuring pin. The can body supporting block holds the can such that the direction for measuring the can seaming width W is identical with the straight line L and the lower face so that the can seam portion contacts the criterion measuring pin.

5 Claims, 4 Drawing Sheets

INSTRUMENT FOR MEASURING DIMENSIONS OF A CAN SEAM PORTION

BACKGROUND OF THE INVENTION

1. Field of the Invention

The present invention relates to an instrument for measuring dimensions of a seam portion between the body and the cap of a can which is used as a canning container of foodstuffs, etc.

2. Background Art

A can which is used as a canning container of foodstuffs, etc. is seamed after filling the can with the contents and seaming the cap to the body. A dimensional control of this seam operation is an important measure for judging the can seamability. A process control is necessary to ensure that cans difficult to seam do not occur by regularly inspecting the seam portion of the cans after completion of the seaming process.

FIG. 4(a) is a view showing a seamed can body and cap. FIG. 4(b) is a view showing the section of a seam portion formed by seaming. This seam portion is formed by overlapping a body hook BH formed with edge 1b of the neck portion of the can body rolled in and a cover hook CH formed with edge portion 2a of the can cap rolled in and pressing the overlap strongly. Usually, the seam portion slants outwardly at a microangle of $\theta$ from an extension line of the can body according to the dismantling of a seaming tool, quality of the can, inner pressure of the can, etc.

An inspection is made from many aspects in order to judge the quality of the seam portion. Usually, respective dimensions are measured for the seaming thickness T, seaming width W, counter sink C, body hook BH, cover hook CH, overlap OL (as shown in FIG. 4(b) and can height H (as shown in FIG. 4(a) the seaming thickness T and seaming width W exceed any defined value among these measured values, poor seaming is likely to occur. Thus, the seaming thickness T and seaming width W are the most important areas to be measured.

The present invention is directed to an instrument for measuring exactly these seaming thickness T and seaming width W.

Conventional methods for measuring seaming thickness T and seaming width W involve a method in which one measures a can using a micrometer for and then enters the measured value on a recording paper. However, this method has inherent problems in the skill required to measure the seaming thickness T and seaming width W by maintaining an accurate measuring angle since the seamed portion is circular and slant; an indicator scale of the micrometer is small and difficult to read; and much time is required to record the measured values.

Equipment has been developed for automatically measuring seamed portions using a device for measuring can seam dimensions as disclosed in Japanese Laid-Open Patent Publn. No. 63-108935. A method for inspecting cans is disclosed in Japanese Laid-Open Patent Publn. No. 64-2744. While these devices are useful for labor-saving, they have the following disadvantages because of their complex structure. For example, much time is spent in exchanging a mold in accordance with the kind of can being measured in confirming the measuring accuracy after exchange of a mold. Further, the device used is large and requires a wide area for installation.

SUMMARY OF THE INVENTION

The present invention is such as been made by considering the above problems and makes it an object to provide an instrument for measuring dimensions of a can seam which is so designed as to ensure an exact measurement by a simple operation.

A further object of the present invention is to provide a measuring instrument of a can seam portion which is so designed that an exact measuring accuracy can be reproduced by the quick mold exchange in response to measuring dimensions about different kinds of cans.

Other objects and merits of the present invention will be apparent from the following explanation.

According to the present invention, there is provided the following measuring instrument in order to achieve the above objects, i.e. a measuring instrument enabling one to determine dimensions of a spot of the can to be measured through a simple operation by placing the can cap face or the can body face on the supporting block, the spot of the can to be measured is held between the criterion measuring pin and measuring spindle of the measuring instrument.

In accordance with the present invention, the above problem can be overcome by providing an instrument for measuring dimensions of a can seam portion, said device characterized by including a criterion measuring pin, a linear gauge provided with a measuring spindle which is so supported as to be movable along a straight line L in the direction of said criterion measuring pin and in the direction of leaving said criterion measuring pin, a can cap supporting block which holds the can such that the direction of measuring can seaming thickness T may be identical with the above straight line L and the inner face of the can seam portion may contact said criterion measuring pin, and a can body supporting block which holds the can such that the direction of measuring can seaming width W may be identical with the above straight line L and the lower face of the can seam portion may contact said criterion measuring pin.

DETAILED DESCRIPTION OF THE PREFERRED EMBODIMENT

Figure 1:
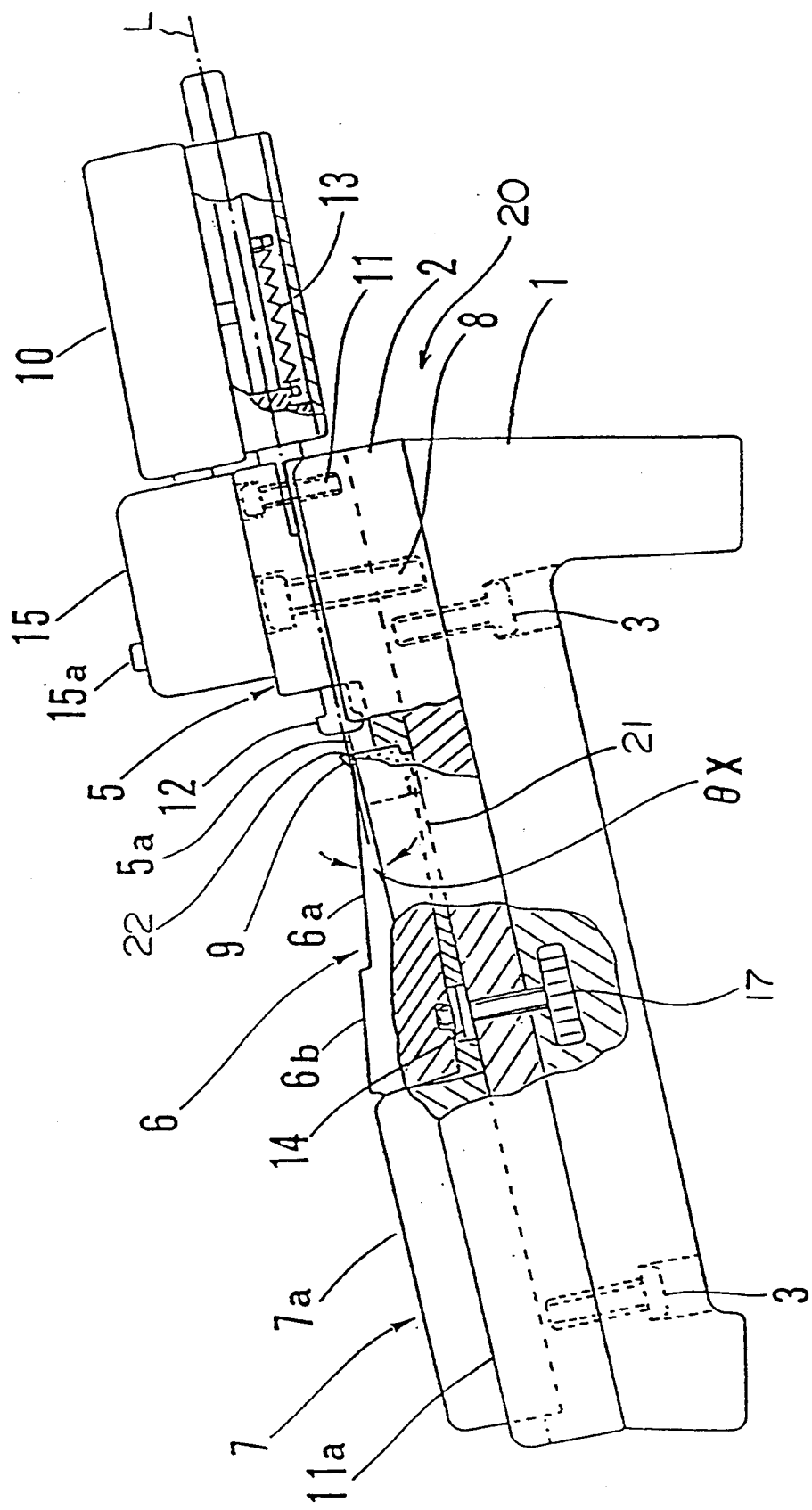
FIG. 1 is a side view of the instrument for measuring dimensions of a can seam portion conformable with any suitable working example of the present invention.
Figure 2:
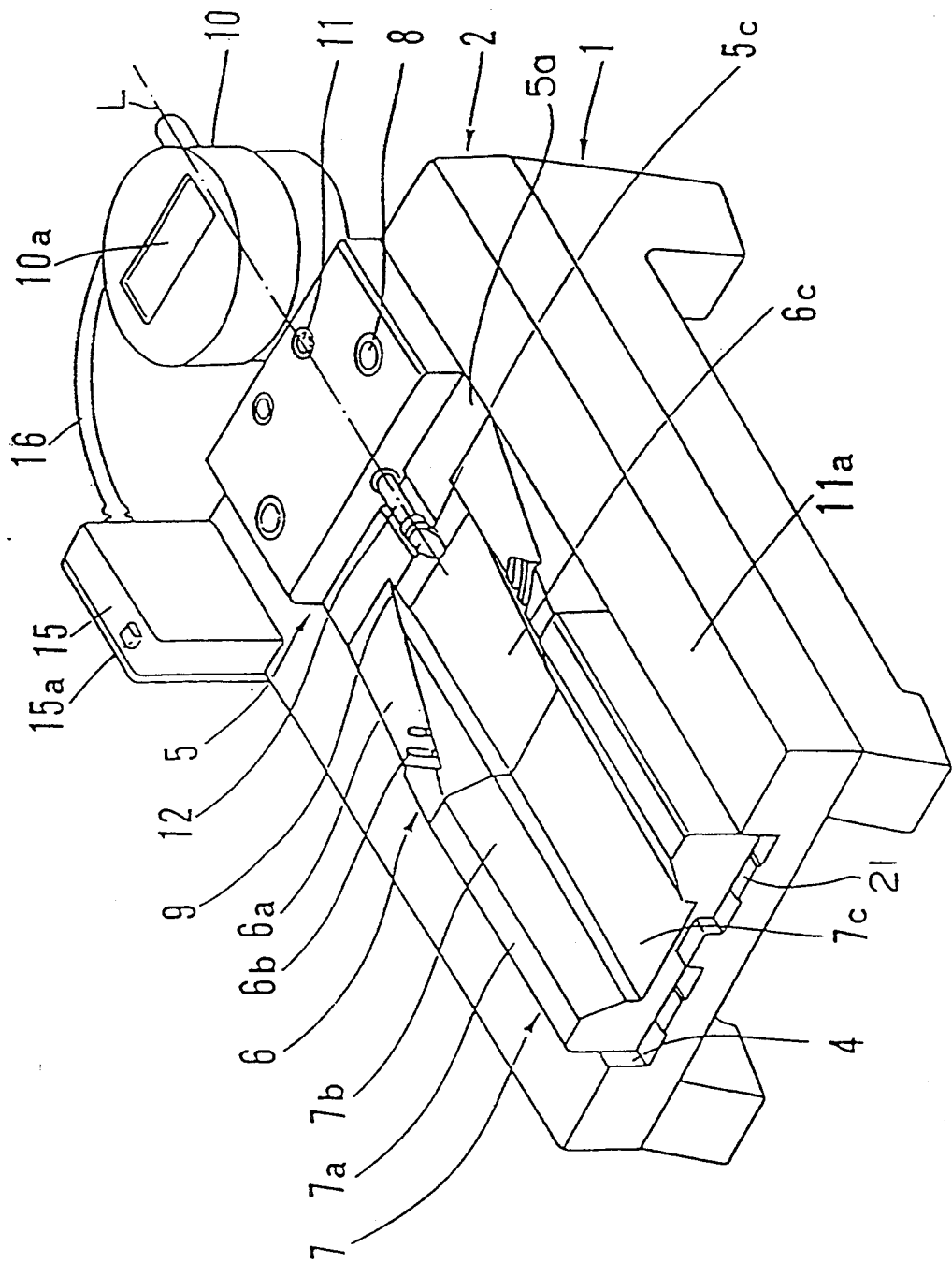
FIG. 2 is a perspective view of the instrument for measuring dimensions of a can seam portion in FIG. 1.
Figure 3:
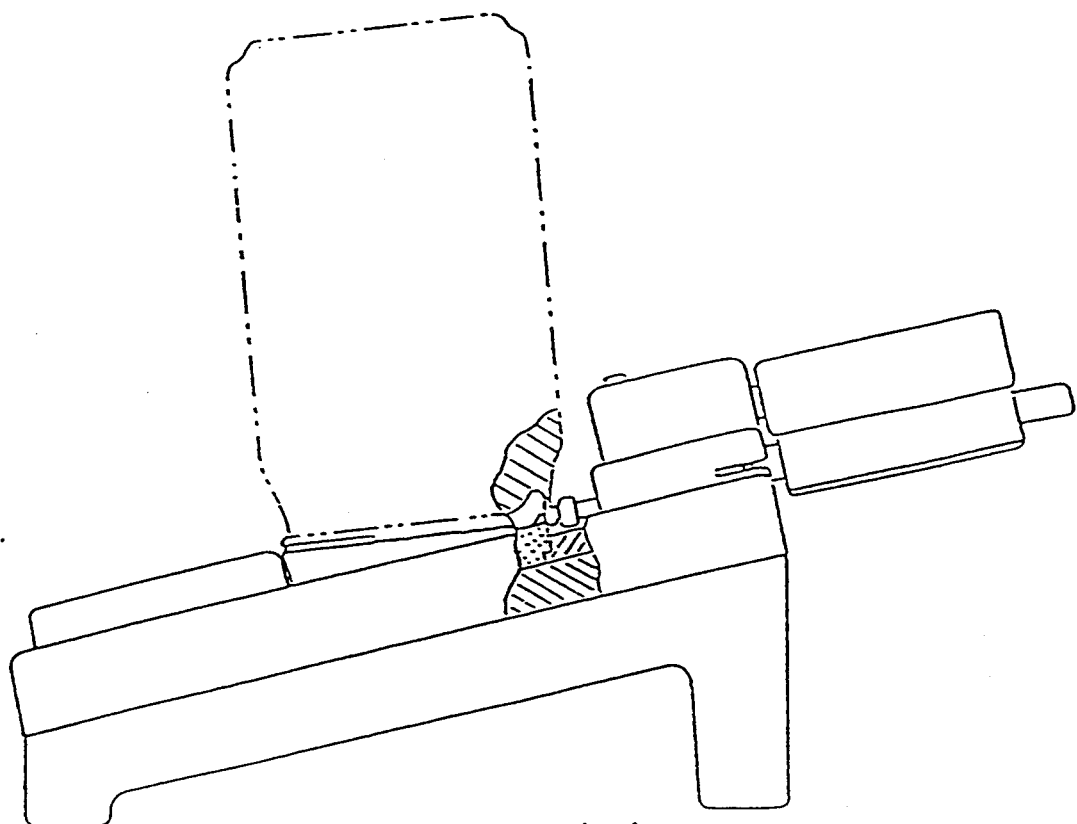
FIG. 3(a) and (b) are each a side view taken when the can seam thickness and can seaming width are measured by the instrument for measuring dimensions of a can seam portion in FIG. 1.
Figure 3:
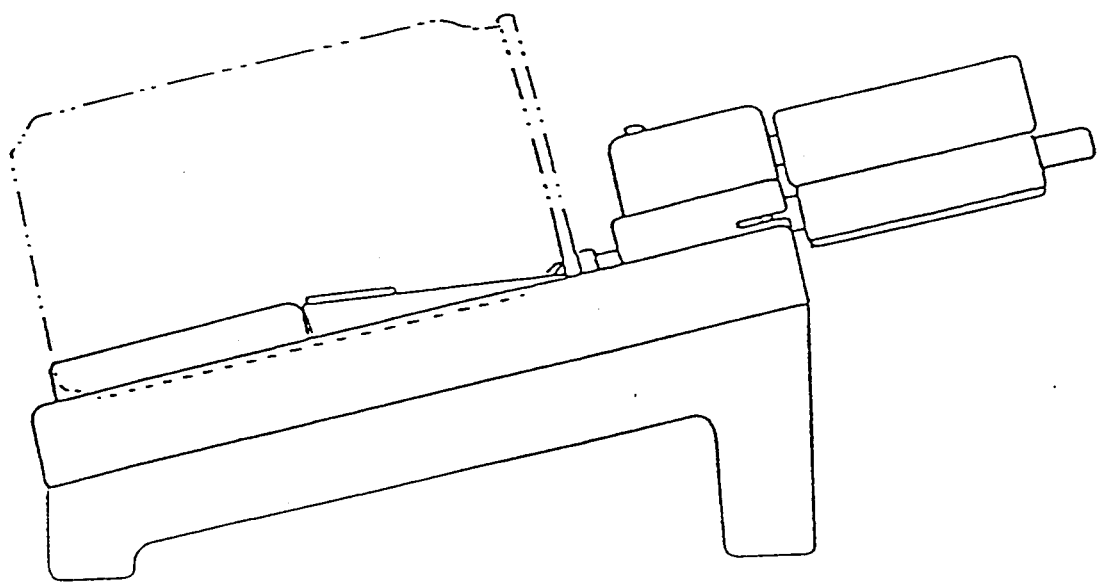
Figure 4A:
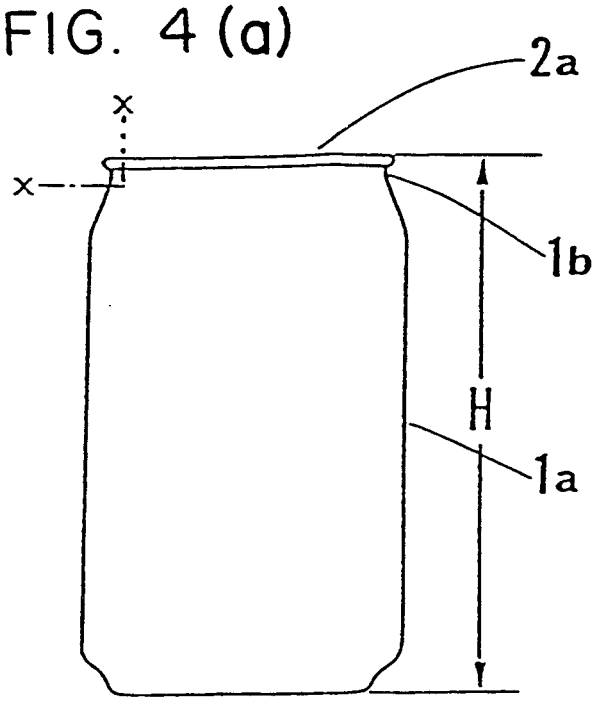
FIG. 4(a) is a side view of the seamed can.
Figure 4B:
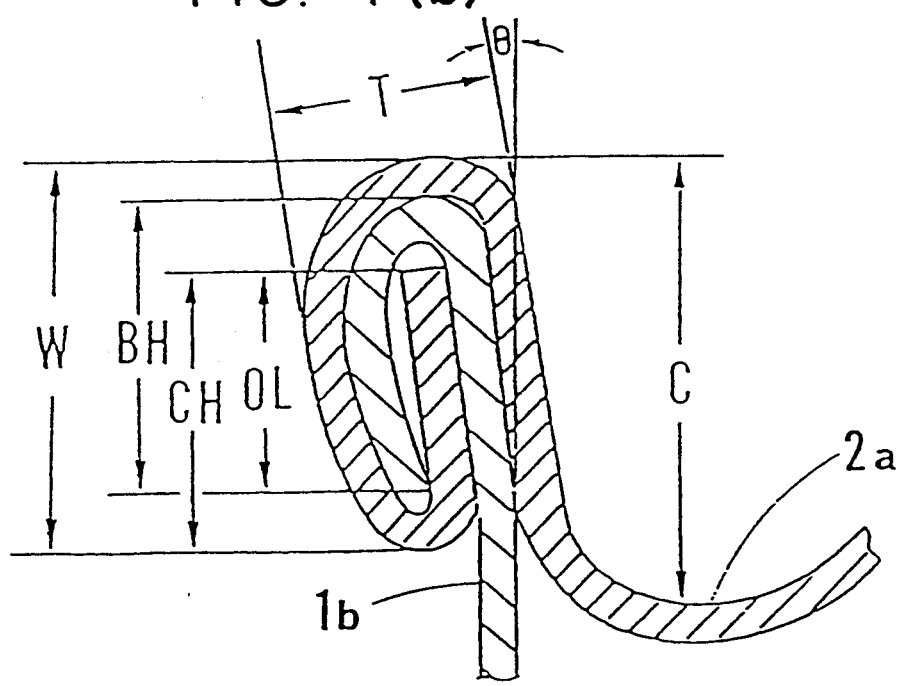
FIG. 4(b) is a sectional view taken on line X—X in FIG. 4(a).

Firstly, an explanation will be made of the structure of the measuring instrument of dimensions of a can seam portion on the basis of the accompanying drawings. FIG. 1 is a side view of the entire measuring instrument. FIG. 2 is a perspective view of the entire measuring instrument. FIGS. 3(a) and 3(b) are side views at the time of measuring can seaming thickness T and can seaming width W.

In FIGS. 1 and 2, 1 denotes a base having a slaned upper face. A measuring stand 2 is fastened to the base 1 by means of a bolt 3. Said stand 1 and measuring base 2 form a supporting stand 20. On the upper face 21 of the groove 4 in the measuring stand 2 are linearly placed a measuring block 5, a can cap support 6 and a body supporting block 7. The measuring block 5 is fixed onto the measuring stand 2 by means of a bolt 8.

On the measuring block 5 are arranged a criterion measuring pin 9 against which the spot of a can to be measured is held and a linear gauge 10 for measuring the distance from said criterion measuring pin 9 in the following position. In the criterion measuring pin 9 its criterion face 22 is so fastened at a light angle to the upper face 5a of the measuring block 5. And the linear gauge 10 is so fixed as to be in parallel with the upper face 5a of the measuring block 5 and as to be on the straight line extending from the criterion measuring pin 9 by means of bolt 11.

Further, the measuring spindle 12 of the linear gauge 10 reciprocates along the straight line L and is pressed in the direction of criterion measuring pin 9 by means of a spring 13 of the linear gauge 10 at a measuring pressure which is always constant. The edge of the measuring spindle extends beyond that the criterion face 22 of the criterion measuring pin 9.

The upper face of the cap supporting block 6 constitutes the cap supporting face 6a which holds the can with the can cap face (seam portion) placed facing the cap supporting block 6. Part of the left and right portions of the cap supporting face 6a is provided with guide projections 6b which are adjustable to conform to different can diameters. The guide projections 6b guide the can such that the diameter of the can cap is aligned with the above straight line L. Further, the center of the upper face 6a is made in the form of groove 6c (FIG. 2).

Further, the cap supporting face 6a may be adjusted to an angle θX (i.e. the angle of the cap supporting face 6a with the upper face 5a of the measuring part of the measuring block 5) equivalent to a slant angle θ of the seaming thickness T of a can to be measured. The cap supporting face 6a is adjusted by means of an adjustment screw 17 and an angle adjustment shim 14 at the intersection of the upper face 5a of the measuring block 5 and the criterion face 22 of the criterion measuring pin 9.

The can body supporting block 7 is provided with an upper face 7a which is parallel to an upper face 11a of the shoulder of the measuring stand 2 and a V-shaped groove 7b which supports the can body.

The centerline of the V-shaped groove 7b parallel to the central axis of the measuring spindle 12. Moreover, this groove is made V-shaped to insure that the can body face and the upper face 5a of the measuring part of the measuring block 5 are parallel when the can is so placed such that a lower face of the neck of the body of a can to be measured may touch the criterion face 22 of the criterion measuring pin 9. The size of the groove is determined by the outer diameter of the can body and the outer diameter of the neck of the can body. Accordingly, the can cap supporting block 6 is exchangeable to different size cans.

A wireless transmitter 15 is fastened to the measuring stand 2 and connected to the linear gauge 10 via cable 16. This wireless transmitter includes a circuit in which any data measured by the linear gauge 10 is indicated as a digital numerical value on the display 10a at the top face of the linear gauge 10. This value is outputted to the wireless transmitter 15 and then to a data processor (not shown) with a receiving function by pressing a transmission switch 15a of the transmitter 15. The linear gauge 10 and the wireless transmitter 15 are preferably powered using a battery system.

A procedure for measuring the dimensions of a can seam using a measuring instrument having the above structure will be explained.

First, measuring the dimensions of the can seaming thickness T, the apparatus is adjusted for a slant angle θ of the seaming thickness T according to the kind of cans being measured. The can cap supporting block 6 is adjusted to an angle of using the adjustment screw 17 and the angle adjustment shim 14 to be identical with the can's slant angle. This brings the following two directions into agreement, i.e., the direction for measuring can seaming thickness T and the direction of movement (straight line L) of the measuring spindle 12. Successively, the can seam portion to be measured is placed face down against the cap supporting block 6 and the measuring point is held gently against the measuring spindle 12 to thereby force the can open and the measuring point is placed in the center of the guide projections 6b of the can cap supporting block 6 while being held between the measuring spindle 12 and the criterion measuring pin 9. As a result, the seaming thickness T is measured by means of the linear gauge 10. Further, seaming thickness T dimensions at any optional point can be determined by rotating the can in the above state.

Secondly, at the time of measuring dimensions of the can seaming width W, the can body supporting block 7 selected according to the kind of can being measured is disposed in the groove 4 of the measuring stand 2.

Next, the can body is placed laterally in groove 7b of the body supporting block 7. The seam measuring point is held gently against the measuring spindle 12 to thereby force this open and the measuring point is held between the measuring spindle and the criterion measuring pin 9. As a result, the seaming width W is then measured using the linear gauge 10.

Thus the seaming width W is determined where the direction of measuring the can seaming width W and the direction of movement (straight line L) of the measuring spindle 12 agree with each other.

Further, seaming width dimensions at any point can be optionally determined by rotating the can in the above state. These measuring data are indicated as digital numerical values on the display 10a at the top face of the linear gauge. After confirming its numerical value, the transmission switch 15a of the wireless transmitter 15 is pressed for transmitting its data signal to a data processor.

By repeating the above operation, it is possible to measure seaming thickness and width dimensions at any optional point and easily record the transmitting as described above, the present invention enables one to take a quick and exact measurement by performing a simple operation requiring minimal skill. This saves labor in recording the values by sharply reducing the time spent measuring Moreover, thanks to a simple structure, the measuring instrument can accommodate size cans quickly. The apparatus and method reproduce extremely reliable accuracy in measurement.

The above described apparatus and method are given for the purpose of illustration. It will be appreciated that the invention is not limited thereto. It is therefore intended in the following claims to cover any variation or equivalent as falls within the spirit and scope of the invention.

I claim:

1. An apparatus for measuring the dimensions of a seamed portion of a can, comprising:
   a base;
   a cap can supporting block disposed on said base, said cap can supporting block including means for supporting a can on an upper surface thereof in a horizontal position of the can for measuring a width dimension of the seamed portion and means for supporting the can in an upright position of the can for measuring a height dimension of the seamed portion;
   a measuring pin connected to the upper surface of said cap can supporting block for contacting an inner surface of the seamed portion of the can;
   linear gauge means mounted on said base for measuring the dimensions of the seamed portion, said gauge including a measuring spindle movable along a straight line approaching said measuring pin to contact the outer surface of the seam portion thereby measuring the dimensions of the seamed portion of the can between the inner and outer surfaces thereof.

2. An apparatus for measuring the dimensions of a seamed portion of a can, as recited in claim 1, wherein said cap can supporting block further comprises a groove on the upper surface thereof for holding the can in the horizontal position.

3. An apparatus for measuring the dimensions of a seamed portion of a can, as recited in claim 2, wherein said cap can supporting block includes an upper face for supporting the seamed portion of the can in the upright position at a predetermined angle.

4. An apparatus for measuring the dimensions of a seamed portion of a can, as recited in claim 3, further comprising an adjustment means for adjusting the angle of said cap can supporting block with respect to said linear gauge means.

5. An apparatus for measuring the dimensions of a seamed portion of a can, as recited in claim 4, wherein said cap can supporting block further comprises a plurality of guide grooves receiving the seamed portion of the can in an upright position for holding the can secure when engaged by said measuring spindle.

* * * * *